Sept. 8, 1953 J. M. LEACH 2,651,573
PROCESS FOR MANUFACTURING CONFECTIONS
Filed Nov. 13, 1948 3 Sheets-Sheet 1
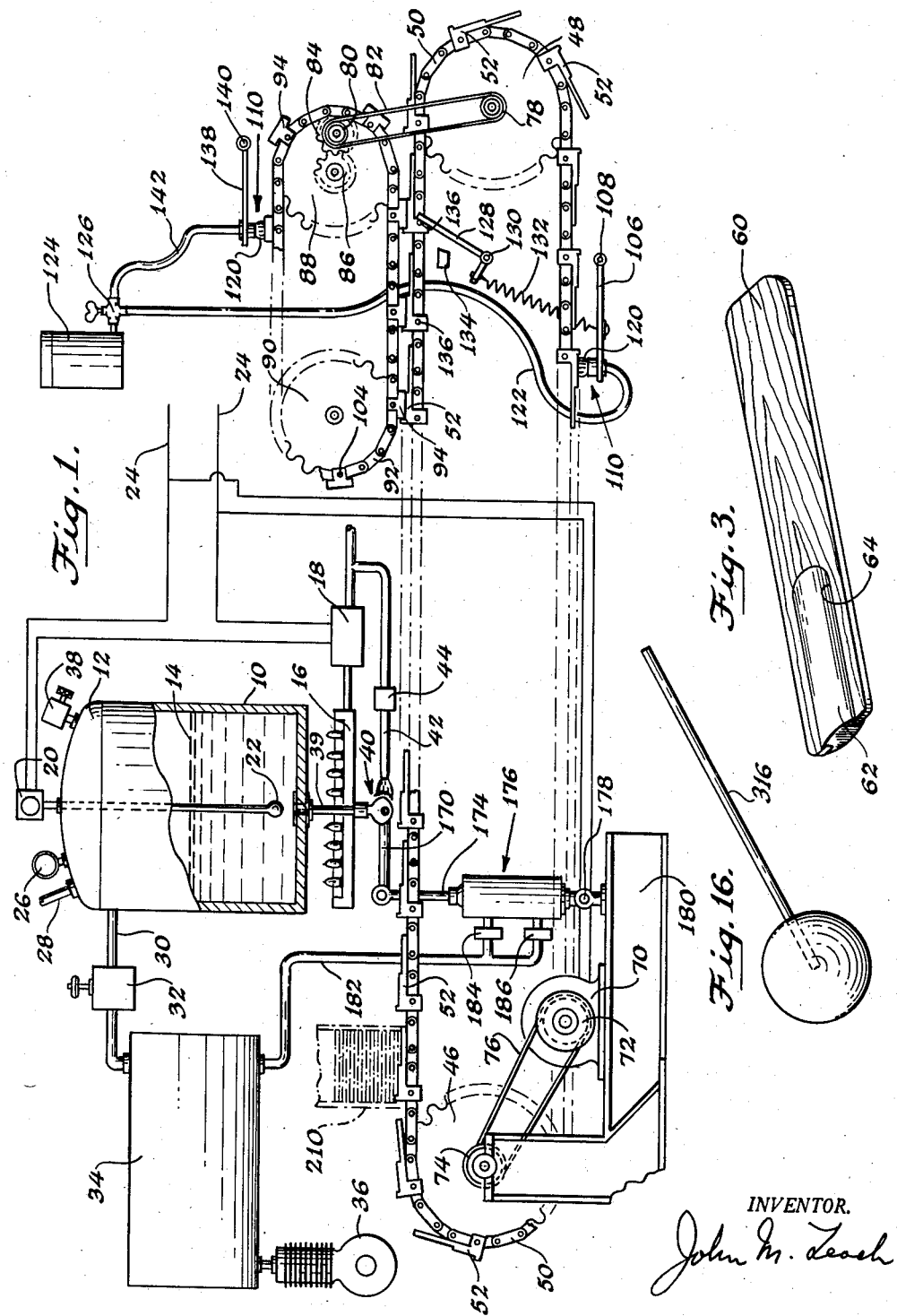
INVENTOR.
John M. Leach

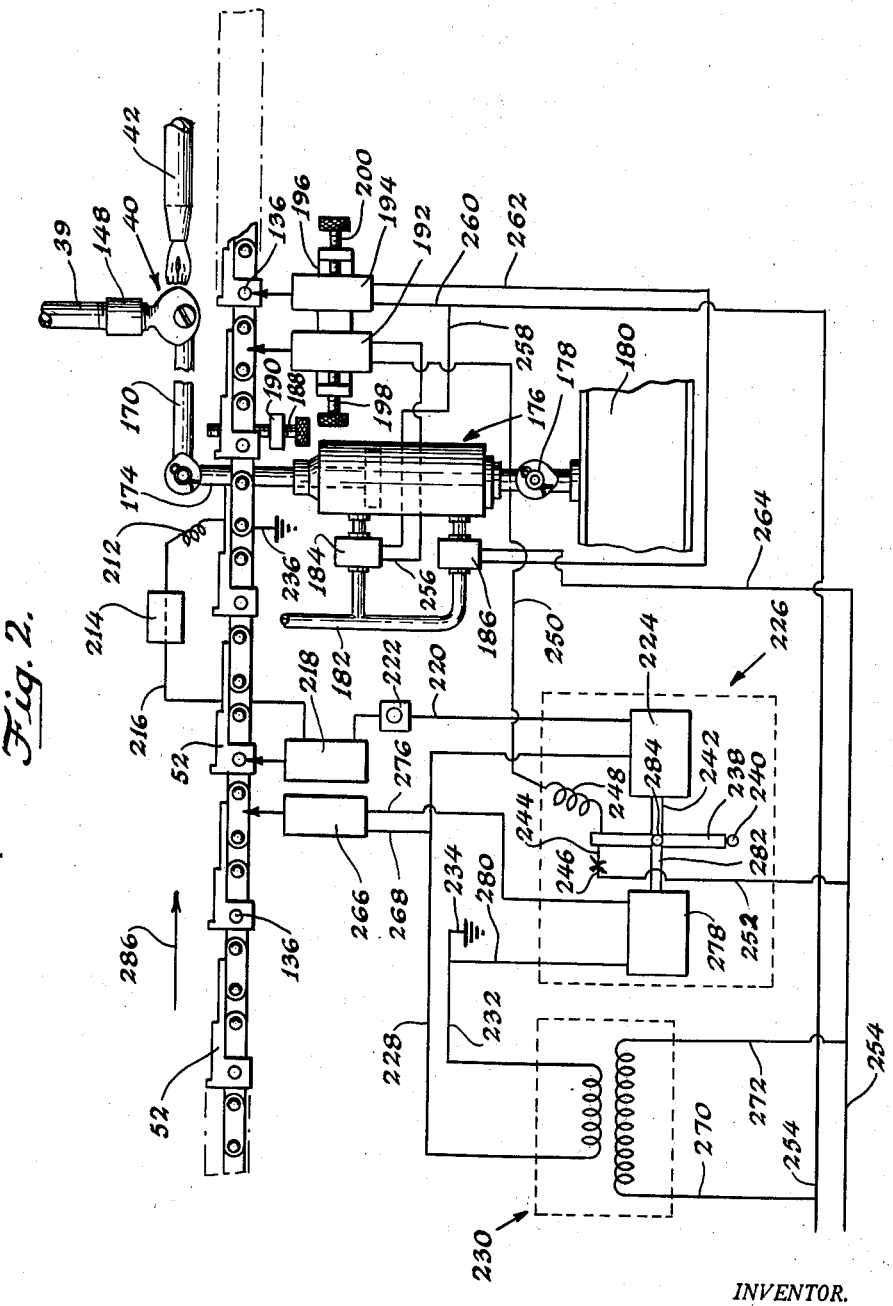

Sept. 8, 1953 — J. M. LEACH — 2,651,573
PROCESS FOR MANUFACTURING CONFECTIONS
Filed Nov. 13, 1948 — 3 Sheets-Sheet 3
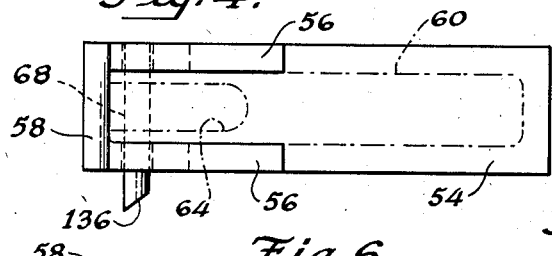
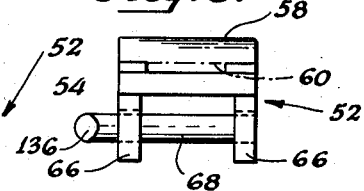
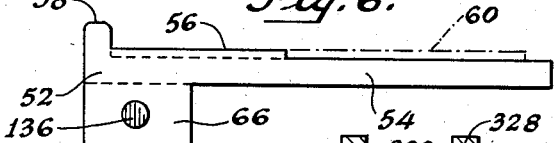
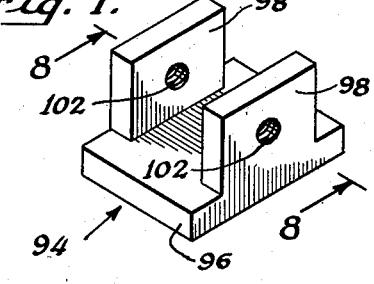
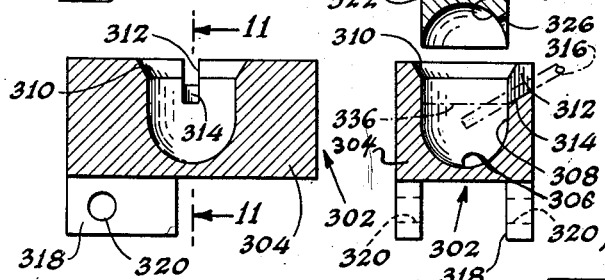
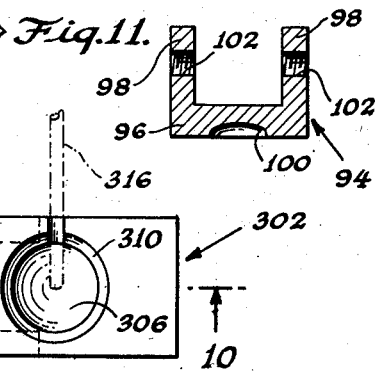
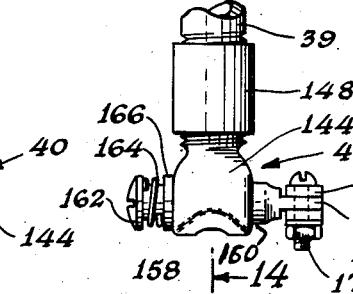
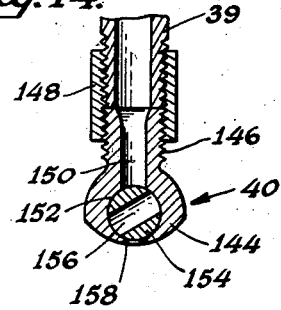
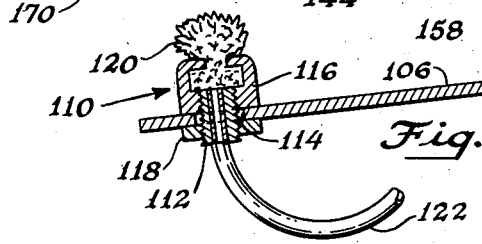
INVENTOR.
John M. Leach Patented Sept. 8, 1953

2,651,573

UNITED STATES PATENT OFFICE 2,651,573

PROCESS FOR MANUFACTURING CONFECTIONS

John M. Leach, Port Washington, N. Y.

Application November 13, 1948, Serial No. 59,845

4 Claims. (Cl. 99—134)

The present invention relates to the art of confection making. More particularly, it relates to a process and apparatus for making hard candies and specialties.

The manufacture of hard candies by conventional methods involves a considerable amount of hand labor. This is caused by the inability of prior machines to handle molten hard candy mixes without either gumming due to solidification of the mix or caramelizing due to exposure of the mix to temperatures slightly above cooking temperatures but within the caramelizing range.

In order to avoid these conditions which occur within a relatively narrow range, the industry has adopted the procedure of cooking the mix to a maximum desired temperature just below the caramelizing range, then dumping the mix on a cold table and working it with paddles until it assumes a taffy-like consistency, at the same time working in coloring and flavoring; then roping it on heated rollers to a desired size or passing it through squeeze rollers to form a sheet, and thereafter passing it to a forming machine such as sucker or drop rolls or a lollypop double-die rotary machine. All of this hand operation has been expensive and time-consuming and has caused the manufacture of hard candy to be a relatively expensive operation. This same or slightly modified operation has been carried over to the manufacture of small packaged candies in the form of rings or squares on a high volume basis.

It is an object of the present invention to provide a machine and process for making hard candy confections on a completely automatic basis.

It is a further object of the present invention to provide a process and machine for making hard candy confections at a high speed at a minimum of expense and also of uniform quality.

It is a still further object of the present invention to make candy confections of unique form, for example, combined tongue-blade lollypops.

Other objects and advantages of the invention will become apparent of those skilled in the art as the description of the invention in its preferred form is disclosed, as, for example, by the present specification, which discloses what is now considered to be the preferred form of the invention.

For a more detailed description of the invention, reference should be had to the following specification taken in connection with the accompanying drawings, throughout which like reference characters refer to like parts, and in which:

Fig. 1 is a schematic view of a machine constructed in accordance with the invention;

Fig. 2 is a fragmentary schematic view of the machine of Fig. 1 showing the wiring connections;

Fig. 3 is a perspective view of one of the candy confections which can be produced by the machine and method of the present invention;

Fig. 4 is a top plan view of one of the elements of the machine of the present invention, namely a movable carriage for one of the products, which forms a bottom die section;

Fig. 5 is an end view of the carriage of Fig. 4;

Fig. 6 is a side elevational view of the carriage of Figs. 4 and 5;

Fig. 7 is a perspective view of a top die member of the machine of the present invention;

Fig. 8 is a central cross sectional view of a top die member taken substantialy on the plane indicated by line 8—8 of Fig. 7 and looking in the direction of the arrows;

Fig. 9 is a top plan view of a modified form of bottom die section of the machine of the type adapted for making lollypops;

Fig. 10 is a central cross sectional view of the bottom die section or member taken substantially on the plane indicated by line 10—10 of Fig. 9 and looking in the direction of the arrows;

Fig. 11 is a cross sectional view of the assembly formed by the bottom die section of Fig. 10 and the top die section of Fig. 7 modified to fit the lower die section of this particular modification;

Fig. 12 is a fragmentary elevational view of the candy valve of the machine.

Fig. 13 is a front elevational view of the candy valve of the machine;

Fig. 14 is a cross sectional view of the candy valve of the machine taken substantially on the plane indicated by line 14—14 Fig. 13; and looking in the direction of the arrows;

Fig. 15 is a fragmentary cross sectional view of the bottom die oiler of the machine, and Fig. 16 is a side view of a lollypop of the type which can be made by the machine and process of the present invention.

The machine of the present invention, referring to Fig. 1, comprises a cooking tank 10 having a removable top 12 which is removably attached to the tank 10 by any well known fastening such as turn-lock connectors (not shown in detail). The tank 10 holds the candy mix during cooking and dispensing as shown at 14.

The tank 10 is heated by any suitable heating source such as the gas burner 16 which is supplied with gas through a gas-electric valve 18 of well known type available on the market. The gas-electric valve 18 is controlled with a thermostat of the type which can be set to close the valve 18 and interrupt the gas flow when any desired temperature is reached by the candy mix. The thermostat is denoted by 20 and has a bulb 22 which extends to near the bottom of the candy mix 14. The valve 18 is energized under the control of the thermostat 20 by a suitable current source 24.

The tank top 12 is supplied with a pressure gauge 26 and is connected to a vacuum pipe 28 and a pressure pipe 30 which is connected through a cut-off valve 32 to a pressure tank 34 which is supplied with air pressure by a compressor 36.

The tank top 12 is also supplied with an introduction valve 38 for a purpose which will be explained later.

A pipe 39 is connected at one end to the bottom of the tank 10 and at the other end to the candy valve 40 and thus forms a secondary chamber with the primary chamber formed by the tank 10. A suitable heating source such as the burner 42 controlled by an adjustment valve 44 heats the valve 40 and secondary chamber. This burner 42 also serves as a pilot flame for the tank heater burner 16. Electrical heaters or steam jackets or any other desired heating source may be substituted for the gas burners if so desired.

Sprocket wheels 46 and 48 are suitably carried for rotation and support between them an endless chain 50 which carries at desired intervals a series of carriages 52 which form bottom die members or sections. These carriages 52 are shown in detail in Figs. 4, 5 and 6 and comprise a flat body 54 provided with raised side pieces 56 and an end shoulder 58. These side pieces 56 and end shoulder 58 provide a recess for reception of a flat blade 60 of the type used by physicians to hold down the tongue of a patient during a throat examination. In the modification shown by Fig. 3, this tongue blade 60 is provided with a confection portion 62 which creates a pleasant taste during the examination and furnishes a lollypop or sucker for consumption by the patient following the examination.

In order to provide a space for the confection portion, the tongue blade 60 is slotted as shown at 64, and when the blade is in position on the carriage 52 the slotted section of the blade is closed at one end by the end shoulder 58 and the blade is retained in position by the raised side pieces 56.

The body 54 of the carriage is also provided with depending lugs 66 through which a stud 68 is passed to hold the carriage in position on the chain 50. The stud 68 passes through an opening (not shown) formed in a cross member of a link of the chain 50. In this manner, each of the carriages is fastened to the chain 50 so as to be carried and moved along thereby as the chain passes over the sprockets 46 and 48 and between them.

The sprocket 46 for chain 50 is driven by a motor 70, which is suitably connected to the current source 24, by means of pulleys 72 and 74 and a belt 76. Any desired type of change speed mechanism may be introduced between the motor 70 and pulley 74 if such is desired.

The other sprocket 48 is connected for rotation with a pulley 78 which drives another pulley 80 through a belt 82. Sprockets and a chain may be substituted for these pulleys and belt if desired. The pulley 80 is connected for rotation with a gear 84 which meshes with and drives another gear 86. The gear 86 is connected for rotation with a sprocket 88 which drives another sprocket 90 through a chain connector 92.

The chain 92 is provided with a series of top die members or sections 94, see Figs. 7 and 8. Each of these top die sections comprises a flat body 96 provided with upstanding lugs 98. The body 96 is provided with a shallow recess 100 which contacts the top of the confection portion of the tongue blade and shapes it and at the same time compresses it tightly within the slotted portion 64 of the tongue blade.

The upstanding lugs 98 are provided with threaded openings 102 through which a threaded stud 104 (Fig. 1) is passed. This stud passes through an opening formed in a cross member of a link of the chain 92 and thus fastens the top die member to the chain. All of the top die members are so fastened to the chain 92 and are thus moved along the chain as it passes over the sprockets 88 and 90 and between them. The relative sizes of the pulleys 78 and 80 and the gears 84 and 86 are such that a top die member contacts each carriage or bottom die member at the exact position to shape and compress the confection portion of each tongue blade as explained above.

In order to prevent the candy from sticking to the die members it is desirable to coat each die member with a light layer of oil, for example of the type known in the candy industry as slab oil. To accomplish this the bottom die members are acted upon by an oiler comprising an arm 106 (see Figs. 1 and 15) which is suitably pivoted at 108 and carries an oiler assembly 110 at its outer end. The oiler assembly comprises a threaded sleeve 112 which passes through an opening 114 in the arm 106 and is threaded into a gland nut 116 and held in place by a lock nut 118. A wick material 120 is enclosed within the gland nut 116 and communicates with a tubing 122 which is tightly held within the sleeve 112 and communicates with an oil storage tank 124 through a double shut-off valve 126.

The bottom oiler is actuated by the following mechanism: A bellcrank 128 is pivoted at 130 and is connected by a coil spring 132 to the arm 106, as shown in Fig. 1. The bellcrank 128 is restrained by a stop 134 from rotating counter-clockwise and is struck at its upper end by a cam surface 136 carried by an end of the stud 68 (Fig. 4) which holds the bottom carriage on the chain 50. The cam surface 136 rotates the bellcrank clockwise and through the spring 132 raises the arm 106 until the wick 120 touches the carriage or bottom die right under the portion which will receive the molten hard candy mix. As the cam surface 136 moves along the bellcrank 128 will ride out from under it and be rotated counterclockwise by the weight of the arm 106 and oiler assembly 110 until the bellcrank strikes the stop 134, where it is in position to be moved by the next cam surface 136 to oil the next bottom die carriage over the area contacted by the molten candy mix.

A top oiler assembly 110 is carried by an arm 138 suitably pivoted at 140 and is connected to the valve 126 by the tubing 142. The oiler assembly for the top oiler is identical in construction with the bottom oiler assembly so it will not be described in further detail. The wick 120 of the top oiler assembly coats the recess 100

(Fig. 8) with a thin layer of slab oil to prevent the top die member from becoming gummed by the semi-molten candy mix.

The candy valve 40 (Figs. 12, 13 and 14) comprises a body member 144 threaded at 146 to receive a nipple 148 which is threaded onto the pipe 39 of the secondary chamber. The body member 144 is provided with a central opening 150 and a cross opening 152 which is tapered and receives a rotatable member 154 which is tapered to provide a close fit in the opening 152. The rotatable member 152 is provided with a bore 156 which is concentric with the opening 150 when the valve is in open position and which rotates to substantially ninety degrees and closes the opening 150 when the valve is in closed position. The valve body 144 is provided with a further opening 158 which is concentric with the opening 156 in the rotatable member when the valve is in open position. The wall of the opening 158 is made very short so as to form a very thin lip at the mouth of the opening 158. This arrangement cuts off the flow of candy mix sharply and prevents the formation of drops of mix at the mouth of the valve.

The rotatable member is provided with a shoulder 160 which abuts the valve body 144 and prevents end movement of the rotatable member 154 in one direction. A screw 162 is threadably connected to the opposite end of the rotatable member 154 and a washer 166 is positioned over the member 154 and abuts the valve body 144. A compression spring 164 is seated between the washer 166 and the head of the screw 162 and thus holds the rotatable member 154 in sealing contact with the interior of the opening 152.

The right hand end of the rotatable member as viewed in Fig. 13 is provided with a flattened extension 168 which receives the bifurcated end of a lever 170 which is fastened to the flattened end 168 of the rotatable member 154 by a through bolt 172.

The lever 170 is pivotally connected at its outer end to a piston rod 174 of a pneumatic actuator 176 of known type available on the open market so that it will not be described in detail. The pneumatic actuator 176 is pivotally connected at its bottom as shown at 178 to a suitable base 180. The actuator 176 is connected by a tubing 182 to the pressure tank 34. An air-electric valve 184 connects one end of the actuator 176 to the tubing 182 and a second air-electric valve 186 connects the opposite end of the actuator 176 to the tubing 182.

The extent of movement of the lever 170 is limited by an adjustable stop in the form of a thumb screw 188 threaded through a fixed member 190.

Micro-switches 192 and 194 are slidably carried by a bracket 196 and are adapted to be moved in either direction along the bracket by thumb screws 198 and 200, respectively. The movable trips of these micro-switches are struck by the cam portions on the ends of the studs 68 which are denoted by the numeral 136. The switch 192, through the apparatus later described energizes the air-electric valve 184 to open the candy valve 40 to discharge molten candy mix into the recess 64 of the tongue blade, or other type of candy mold, and the switch 194 energizes the air-electric valve 186 to close the candy valve 40.

The simple operation just described would suffice for all operations if it were not for the fact that conditions occur which make it undesirable for the candy valve 40 to open. For example, the tongue blades 60 are fed to the bottom carriage dies 52 from a conventional type of magazine feed 210. If this magazine should become empty or should fail to feed a blade to a carriage, the opening of the candy valve 40 above an empty carriage would discharge molten candy mix over the surface of the carriage and would foul the machine. In order to avoid such a situation a checking mechanism is employed to prevent actuation of the candy valve 40 when a tongue blade is not on the carriage in position to be properly filled with molten candy mix.

The checking mechanism comprises a cat whisker 212 carried by an insulating member 214. The cat whisker is connected by a wire connection 216 to a micro-switch 218 fixedly mounted in position to be actuated by the cam surfaces 136 to close the switch circuit. The switch 218 is connected by a wire 220 through an off and on switch 222 to a solenoid 224 of a remote control switch 226. The other contact of the solenoid 224 is connected by a wire 228 to one contact of the secondary of a step-down transformer 230. The other contact of the secondary is connected by a wire 232 to a ground connection 234 on the frame of the machine. The bottom die carriages 52 are of course grounded to the frame of the machine as shown at 236. The solenoid 224 actuates an armature 238 of the remote control switch, which is suitably pivoted as shown at 240, by means of a connecting rod 242. The armature 238 carries a movable contact 244 which co-acts with a fixed contact 246. The movable contact 244 is connected by means of a pig-tail 248 to a connector wire 250 which runs to one terminal of the micro-switch 192. The fixed contact 246 is connected by a connector wire 252 to one side of a source of electric current 254.

The other terminal of the micro-switch 192 is connected by a wire connector 256 to one terminal of the air-electric valve 184. The other terminal of the air-electric valve 184 is connected by a wire connector 258 to the other side of the source of electric current 254.

The other micro-switch 194 shown at the right hand side of Fig. 2 has one terminal connected by a wire connector 260 to one side of the source of electric current 254 and the other terminal is connected by a wire connector 262 to one terminal of the air-electric valve 186. The other terminal of the air-electric valve 186 is connected by a wire connector 264 to the other side of the source of electric current 254.

A micro-switch 266 is positioned so as to have its movable trip actuated by the cam surfaces 136 on the ends of the studs 68 and has one terminal connected by wire connector 268 to the wire connector 228 which is connected to one side of the secondary of the transformer 230. The primary of the transformer 230 is connected by wire connectors 270 and 272 to the source of electric current 254. The other terminal of the micro-switch 266 is connected by wire connector 276 to one terminal of a second solenoid 278 of the remote control switch 226. The other terminal of the solenoid 278 is connected by a wire connector 280 to the wire connector 232 which is connected to the other side of the secondary of the transformer 230. The solenoid 278 actuates a connecting rod 282 which is loosely pivoted at 284 to the armature 238.

In the carrying out of the process of the invention and the operation of the machine of the invention, the ingredients of a candy mix are filled into the tank 10 as shown at 14. The ingredients so placed in the tank at this time will include sugar and water, and, if desired, corn syrup. The tank top 12 is then suitably fastened to the tank and the burners 16 and 42 are lighted. The thermostat 20 is set for a desired temperature below 300 degrees F., preferably 270 to 290 degrees F. The pressure valve 32 and the introduction valve 38 are closed and the pipe 28 is connected to a suitable source of vacuum. As soon as the candy mix reaches 212 degrees F. a "doctor" such as cream of tartar is introduced into the mix by opening the introduction valve 38 and depositing the "doctor" through this valve. The valve 38 is then closed and the cooking continues until the mix reaches the temperature for which the thermostat 20 is set at which time the gas-electric valve 18 is closed by the thermostat interrupting the flow of electric current to this valve. This causes the burner 16 to be extinguished but the burner 40 continues to burn. The intensity of this burner is set by the valve 44 to heat the valve 40 and secondary chamber to 300 degrees F.

The pipe 28 is then suitably closed off from the vacuum source by any desired type of valve (not shown) and the introduction valve 38 is again opened and coloring and flavoring materials are introduced into the candy mix after which the valve 38 is again closed. The valve 32 is then opened to place any desired pressure in the tank above the mix 14. A pressure of 2 to 10 pounds will usually be sufficient.

The valve 126 of the oiler system is then opened and the motor 70 is suitably connected to the power source as by any desired type of switch (not shown). This causes the chain 50 to be driven in the direction of the arrow 286 of Fig. 2. As each bottom die carriage 52 passes under the magazine 210 it has a notched tongue blade 60 deposited thereon as shown in Fig. 4. As the first carriage with a tongue blade on it moves under the candy valve 40 the cam surface 136 of the stud 68 of this carriage strikes the movable trip of the micro-switch 192. This causes a current to flow from the top wire of current source 254 as viewed in Fig. 2 through the connectors 260 and 258 to the air-electric valve 184, through the connector 256 to the micro-switch 192, through the connector 258 and the pig tail 248 to the contact 244 of the remote control switch 226, through fixed contact 246 and connector 252 to the bottom wire of the current source 254 as viewed in Fig. 2. This energizes the air-electric valve 184 so as to admit compressed air from the tank 34 above the piston of the pneumatic actuator 176 to cause the connecting rod 174 to lower and rotate the arm 170 to open the candy valve 40 so as to permit molten candy mix to flow out of the valve 40 and fill the notch 64 of the tongue blade as the blade is moved along by the carriage. As this notch 64 is filled the cam surface 136 passes over the movable trip of micro-switch 192 and strikes the movable trip of the micro-switch 194.

The closing of micro-switch 194 causes a current to flow from the top wire of current source 254 as viewed in Fig. 2 through the connector 260 to the micro-switch 194, through the connector 262 to the air-electric valve 186, through the connector 264 to the bottom wire of the current source 254.

This causes the air-electric valve 186 to become energized and admit compressed air from tank 34 to the space below the piston of pneumatic actuator 176. The air-electric valves are of the type which vent their respective ends of the pneumatic actuator 176 when not energized so as to prevent pocketing of air on the opposite side of the piston from that under pressure from the tank 34.

The admission of air below the piston of the pneumatic actuator 176 moves the connecting rod 174 upwardly to rotate the arm 170 clockwise as viewed in Fig. 2 and close the candy valve 40 and thus stop off the flow of molten candy mix.

As the molten candy mix passes from the primary chamber formed by the tank 10 in which it is at approximately 275–290 degrees F. to the secondary chamber formed by the pipe 39 and the candy valve 40 it is raised to a preferred temperature just below the caramelizing range for the sugars in the mix. This temperature is 300 to 305 degrees F. for most candy mixes. This preferred temperature is controlled by suitable adjustment of the gas valve 44 to hold the flame of burner 42 at just the right intensity to produce this temperature. This temperature is checked from time to time by placing a thermometer against the candy valve 40 and adjusting the gas valve 44 to raise or lower the flame of burner 42 to produce the desired temperature. This temperature does not vary appreciably because the candy mix in the primary chamber is held at a constant temperature by the thermostatically controlled burner 16. If the temperature of the candy mix in the primary chamber tends to lower, the thermostat 20 opens the gas-electric valve 18 to supply gas to the burner 16 which is ignited by the flame of burner 42. When the temperature again stabilizes at the desired point the thermostat 20 closes the gas-electric valve 18 to shut off the burner 16.

In this manner, the candy mix in the primary chamber is held in a freely molten state but below the caramelizing range and is moved up to the desired top cooking temperature in the secondary chamber just before it is dispensed through the candy valve 40. Thus the present invention makes it possible to hold a large quantity of hard candy mix in a molten state, so as to permit it to be dispensed through a valve, for a long period without causing it to discolor and change flavor due to caramelization. This has never been accomplished prior to this invention by prior art processes.

In the event the amount or rate of flow of the molten candy mix through the candy valve 40 was not correct to properly fill the notch 64 of the tongue blade, the rate of flow can be controlled by adjusting the thumb screw 188 (Fig. 2) so as to stop the arm 170 at a position to lessen or increase the flow of mix through the valve 40. The angular position of the opening 156 is suitably adjusted relative to the arm 170 to increase the amount of flow through the valve 40 as the arm 170 is lowered.

In the event the valve 40 did not open at the correct time relative to the position of the carriage 52, it can be caused to open sooner by moving the micro-switch 192 to the left, as viewed in Fig. 2, by the thumb screw 198, and conversely, the valve 40 can be caused to open later by moving the thumbscrew 198 so as to move the micro-switch 192 to the right. Also, the time of closing of the valve 40 can be similarly controlled by moving the thumbscrew 200 to move the micro-switch 194 to the left to close valve 40 sooner or to the right to close valve 40 later. Thus by means of the thumbscrews 188, 198 and 200 it is possible to accurately control the amount of molten candy mix which is dispensed by the valve 40 and the position relative to the carriages 52 at which it is dispensed.

In the event the magazine 210 fails for any reason to deposit a tongue blade 60 upon any carriage 52 during the operation of the machine, the cat-whisker 212 will make electrical contact with the empty carriage and when the following carriage is in position where the cam surface 136 of its stud 68 operates the movable trip of micro-switch 218 a current is caused to flow from one side of the secondary of step-down transformer 230 through the conductor 232 to ground 234 which is common to ground 236, through the carriage 52 and cat-whisker 212 to conductor 216 to micro-switch 218, through conductor 220 and closed switch 222 to solenoid 224, through conductor 228 to the other side of the secondary of transformer 230. This energizes solenoid 224 and actuates connecting rod 284 to rotate the armature 238 clockwise as viewed in Fig. 2 to move the contact 244 and break the circuit described above for micro-switch 192 and air-electric valve 184. Under this condition, the micro-switch 192 is not able to energize the air-electric valve 184 when the cam surface 136 of the stud 68 of the empty carriage strikes the movable trip of the micro-switch 192 so that the candy valve 40 is not opened for this carriage and no flow of molten candy mix onto an empty carriage occurs.

It is possible that the next carriage after the empty one may receive a tongue blade 60 from the magazine so that normal operation of the candy valve 40 should be resumed. To accomplish this, micro-switch 266 is positioned so that its movable trip is actuated by a cam surface 136 of a carriage 52 just after the cam suface 136 of the empty carriage has actuated the movable trip of the micro-switch 192. When the micro-switch 266 is thus actuated it causes a current to flow from one side of the secondary of transformer 230 through conductors 228 and 268 to the micro-switch 266, through conductor 276 to one terminal of the other solenoid 278 of remote control switch 226, from the other terminal of solenoid 278 through conductors 280 and 232 to the other side of the secondary of transformer 230. This energizes solenoid 278 and moves connecting rod 282 to rotate armature 238 counterclockwise as viewed in Fig. 2 to close contacts 244 and 246. The circuit for micro-switch 192 is thus restored and it will be active to open the valve 40 for the candy mix each time the carriage beneath this valve contains a tongue blade, but the operations described above will take place automatically to prevent opening of the valve when no tongue blade is on the carriage beneath and cause opening of the candy valve 40 when the carriage beneath contains a tongue blade regardless of how frequently an empty or filled carriage appears beneath the valve. This insures that each blade will receive a charge of candy and that no empty carriage will receive a charge of candy.

As the tongue blades with their notches filled with molten candy move along they are cooled either by natural dissipation of heat or by having a stream of air or refrigerated air directed against them to cause the candy to assume a plastic state. The candy in a plastic state then passes into position where the top dies 94 contact the candy mass and shape it, compress it tightly within the notches 64 and complete or substantially complete the cooling process to harden the candy. These dies may be suitably cooled by air streams (not shown) if desired.

As the bottom die carriages 52 pass over the sprocket 48 the completed combination tongue blade-confections are suitably removed and packed for shipment.

In addition to the specialty product previously described, the process and machine of the present invention can be used to make any other well known or desired new type of hard candy confection. For example, lollypops, hard balls, drops, fancy figures and the like can be produced merely by changing the configuration of the top and bottom dies.

The type of top and bottom dies for making lollypops, as an example, are illustrated by Figs. 9, 10, and 11. These dies comprise a top die 300 and a bottom die 302. The bottom die 302 comprises a body 304 having a cavity which is hemispherical at its bottom as shown at 306 and becomes cylindrical near its top as shown at 308. This cavity is flared outwardly at its top by the bevel 310. The bottom die 302 is shown in cross section in Fig. 11 on a plane indicated by line 11—11 of Fig. 10 and looking in the direction of the arrows. One side of the die is slotted as shown at 312 and the bottom of this slot is slanted inwardly as shown at 314. The purpose of this slot is to receive and hold a candy stick 316. The body 304 is provided with two depending lugs 318, each having an opening 320 to receive a stud to fasten the die to a chain in the same manner as previously explained for the tongue blade dies.

The top die of Fig. 11 comprises a body 322 having a cavity 324 which is slightly less than a hemisphere. The body is slotted as shown at 326 to provide clearance for the candy stick 316. The body 322 is provided with two upstanding lugs 328, each of which is provided with an opening 330 to receive a stud for fastening the top die to a chain in the same manner as previously explained for the top tongue blade die.

The carrying out of the process of the present invention and the operation of the machine of the present invention is substantially the same when the dies of Figs. 9, 10 and 11 are used as when the tongue blade dies are used. The main differences are that the candy valve 40 is adjusted to open further and discharge a larger quantity of molten candy mix into the bottom die 302 and preferably a spray type oiler is used to oil the die cavities because of their depth. The molten candy mix is preferably filled into the bottom die cavity 306 until the cavity is filled to a point just above the diameter line as shown at 336. The amount of candy mix above the diameter line is forced up into the top of the cavity 324 of the top die member 300 when the latter is moved down into the cavity of the bottom die member 306 when the two die members are brought together towards the end of the travel of the candy mix in the bottom die member as explained above in connection with the tongue blade. The slot 326 in the top die member fits over the candy stick 316 and prevents candy mix from being forced into the slotted area.

Any desired type of atomizer pump may be used to spray oil into the cavities 306 and 324 of the bottom and top die members in order to oil these cavities to prevent sticking of the candy in the dies. The confection can be ejected from the bottom die member by exerting pressure upwardly on the sticks 316 by any suitable means as the chain carrying the bottom dies passes over the sprocket 48 so that the confections drop out of the dies upon any suitable reception surface or container.

The process and machine of the present invention make it possible for the first time to produce hard candy confections on an automatic basis and at a minimum of expense in regard to time and handling. Also, this process and machine produces candy of a more uniform consistency than prior art operations, all of which contribute to the advancement of the art of candy making.

Since certain changes in carrying out the above process and in constructing the above machine may be made without departing from the spirit and scope of the present invention, it is intended that all matter contained in the above description and shown in the accompanying drawings shall be considered as illustrative and not in a limiting sense.

The process and apparatus of the present invention have been used commercially to bring large batches of hard candy to a molten state where it can be held for a sufficient time to permit it to be dispensed directly into candy forming molds without either burning, discoloring, losing flavor, crystallizing or otherwise becoming unfit for candy use. The feature of holding the batch at a sufficient temperature to be molten but below any temperature which harms the batch, and then bringing relatively small quantities of the batch up to the proper temperature to produce a high grade of hard candy, free from crystallization, stickiness or discoloration, or other undesirable properties, just prior to separation of the small quantity from the larger batch, and then promptly separating the small quantity by dispensing it into a suitable forming operation, is entirely new with the present invention and is thus an outstanding advance in an old and well known art which has been groping for such an improvement for many years of active operation.

The invention having been described, what is claimed is:

1. A process of making a product which in the candy industry is technically termed "hard candy," which comprises dispersing a mixture of "hard candy" ingredients containing sugar in a thin cross-sectional volume over an area so that the entire volume of mixture can be substantially instantaneously heated, rapidly applying heat to said mixture to raise it substantially instantaneously to final desired cooking temperature to bring about the chemical and physical changes in the mixture which will produce "hard candy" when the mixture is cooled, and suddenly releasing said volume from said heat to avoid caramelization of the sugar.

2. A process of making a product which in the candy industry is technically termed "hard candy," which comprises heating a mixture of "hard candy" ingredients containing sugar, controlling the heating temperature so that it does not rise to the final desired cooking temperature, withdrawing a volume of the mixture which is to be subjected to forming operation, dispersing the said volume in a thin cross-sectional quantity over an area so that said entire volume can be substantially instantaneously heated, rapidly applying heat to said volume to raise it substantially instantaneously to final desired cooking temperature to bring about the chemical and physical changes in the mixture which will produce "hard candy" when the mixture is cooled, suddenly releasing said volume from said heat to avoid caramelization of the sugar, and directing said volume to forming operation.

3. The process of making a product which in the candy industry is technically termed "hard candy," which comprises subjecting a mixture containing sugar rapidly to heat to produce a final cooking temperature to bring about the chemical and physical changes in the mixture which will produce "hard candy" when the mixture is cooled, suddenly releasing the heat to prevent caramelization of the sugar and discharging the mixture directly to a forming operation.

4. A process of making a product which in the candy industry is technically termed "hard candy," which comprises heating a mixture of "hard candy" ingredients containing sugar, controlling the heating temperature so that it does not rise to the final desired cooking temperature, withdrawing a volume of the mixture which is to be subjected to forming operation, dispersing the said volume in a thin cross-sectional quantity over an area so that said entire volume can be substantially instantaneously heated, rapidly applying heat to said volume to raise it substantially instantaneously to final desired cooking temperature to bring about the chemical and physical changes in the mixture which will produce "hard candy" when the mixture is cooled, suddenly releasing said volume from said heat to avoid caramelization of the sugar, and directing said volume to forming operation and at the same time replacing said volume with a second like volume from the original mixture of "hard candy" ingredients.

JOHN M. LEACH.

References Cited in the file of this patent

UNITED STATES PATENTS

| Number | Name | Date |
|---|---|---|
| 330,209 | Callwell | Nov. 10, 1885 |
| 1,227,714 | Waugh et al. | May 29, 1917 |
| 1,432,918 | Steely | Oct. 24, 1922 |
| 1,682,146 | Riebe | Aug. 28, 1928 |
| 1,785,904 | Hompe | Dec. 23, 1930 |
| 1,796,934 | Laureys | Mar. 17, 1931 |
| 1,884,948 | Witherspoon et al. | Oct. 25, 1932 |
| 1,970,870 | Skazin et al. | Aug. 21, 1934 |
| 2,197,919 | Bowman | Apr. 23, 1940 |

FOREIGN PATENTS

| Number | Country | Date |
|---|---|---|
| 630,521 | Germany | May 29, 1936 |